H. BROWN.
TIRE ALARM.
APPLICATION FILED APR. 23, 1919.
1,341,613.
Patented May 25, 1920.
2 SHEETS—SHEET 1.
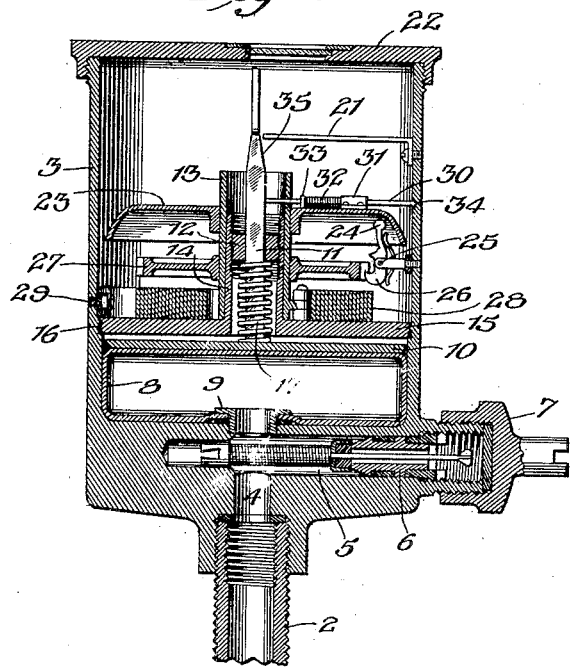
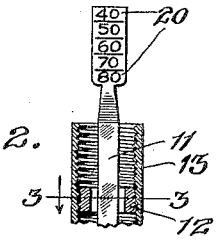
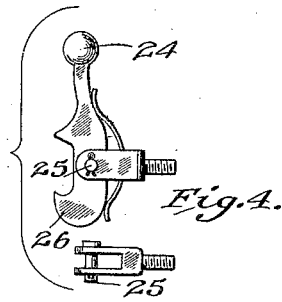
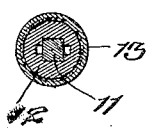
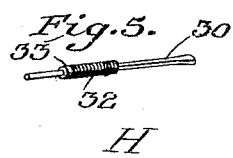

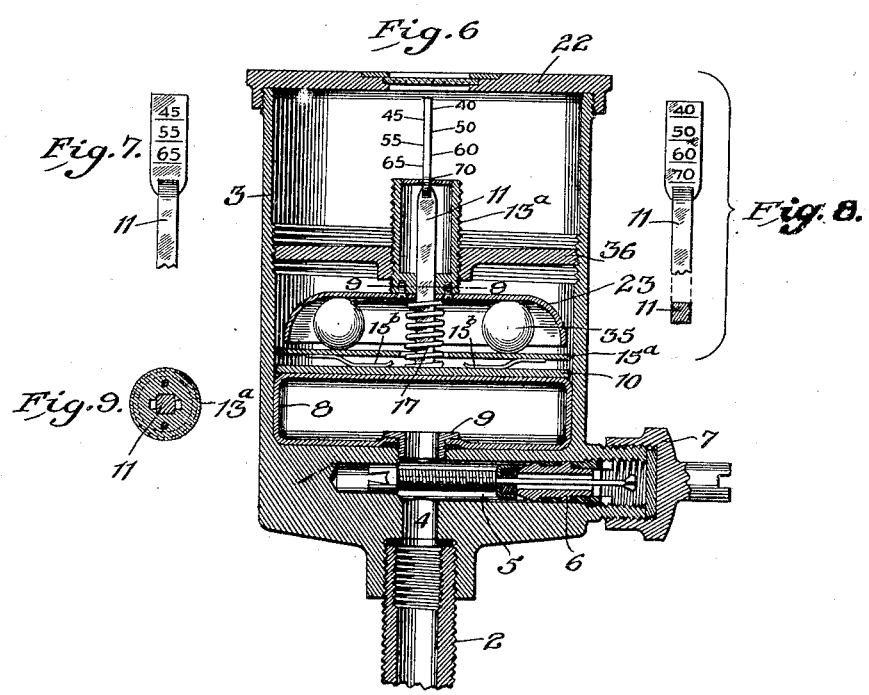

UNITED STATES PATENT OFFICE.

HAROLD BROWN, OF DACOMA, OKLAHOMA.

TIRE-ALARM.

1,341,613.  Specification of Letters Patent.  Patented May 25, 1920.

Application filed April 23, 1919. Serial No. 292,171.

*To all whom it may concern:*

Be it known that I, HAROLD BROWN, a citizen of the United States, residing at Dacoma, in the county of Woods and State of Oklahoma, have invented certain new and useful Improvements in Tire-Alarms; and I do hereby declare the following to be a full, clear, and exact description of the invention, such as will enable others skilled in the art to which it appertains to make and use the same.

This invention relates to alarms and particularly to a type of alarms or signaling devices adapted to be connected to automobile pneumatic tires for the purpose of giving an indication when the air pressure therein has for any reason fallen below a predetermined average or minimum degree.

It is one of the objects of the present invention to provide a device of this type of such design and construction that it can be readily attached to the tube valve stem of the pneumatic tire tube and which device is provided with a suitable form of valve controlling the inlet of air from a suitable source of pressure, to inflate the tube of the tire, and at the same time it is an object of the invention to provide pneumatic means within the device for actuating a pressure indicating member which is provided with data designed to indicate the degree of pressure which may obtain in the tire and device and a further object of the invention is to provide a signal or sound making means, controlled by the pneumatic element in the device so that when the signal or indicating member recedes to a given point then the device operates to give an audible signal.

With these and other objects in view as will be rendered manifest to those versed in the art the invention consists in the construction, the combination, and in details and elements of the parts as more particularly described in the following specification relative to the embodiments of the invention illustrated in the accompanying drawings in which—

Figure 1 is a central, longitudinal, sectional view through a form of the alarm giving device showing it attached to a portion of a pneumatic tire stem.

Fig. 2 is a detail view of the upper portion of the pressure indicating device.

Fig. 3 is a section on line 3—3 of Fig. 2.

Fig. 4 is a group view showing in detail the keeper and its mounting.

Fig. 5 is a detail perspective view of the gong latch.

Sheet, 2, Fig. 6, is a central, longitudinal, sectional view through a modified form of the alarm and indicating device.

Figs. 7 and 8 are views of opposite faces of the pressure indicating member.

Fig. 9 is a cross-sectional view on line 9—9 of Fig. 6.

In the embodiment of the invention as seen in Figs. 1 to 5 inclusive, 2 indicates the upper and threaded end of the usual valve stem of a pneumatic tire and on this is threaded or otherwise suitably mounted a cup-shaped and cylindrical casing 3 having a central opening 4 in its bottom registering with the chamber of the valve stem 2 and disposed at right angles to the bore or opening 4, is a valve receiving chamber 5, in which is shown a suitable form of conventional pneumatic valve 6 the outer cap 7 of which may be removed when it is desired to inflate the tire to which the stem 2 is secured.

Mounted in the lower part of the casing 3 and resting upon the bottom thereof is an inflatable or elastic bag or pouch 8 attached as by a gland 9 or suitable means to the bottom of the casing so as to communicate with the axial opening 4 and permit the pressure of air into the bag 8 simultaneously with its pressure into the pneumatic tire being inflated. Resting upon the bag 8 is a disk 10 freely fitting in the casing and having an outwardly extending and central pin or spindle 11 which is guided through a nut 12 adjustably disposed in a surrounding sleeve 13 the lower end of which encompasses the threaded hub 14 of a plate or disk 15 threaded as at 16 in the casing 2. The pin 11 is surrounded at its lower portion by a spring 17 expansively acting against the bottom of the nut 12 to push the disk 10 downwardly against the reaction of the inflated bag 8. The upper end of pin 11 is provided with a suitable pressure indicating indicia as the numerals "40" to "80" inclusive and indicated at 20 increasing progressively from the upper end downwardly along the stem and as these numbers are exposed by the upward movement of the piston 10 they move relative to an index finger 21 or any other suitable pointing medium conveniently arranged in or mounted on the device. From the foregoing it will be seen that as the tire is inflated the bag is distended; the disk 10 is elevated against the pressure of spring 17 and the index portion of the pin is moved past the pointing or indexing member 21 and the operator may read the indicated pressure through a windowed top or cover 22 mounted on the casing 3.

To secure an automatic, audible alarm in the event of the fall of pressure below a predetermined average or minimum there is fixed on the sleeve 13 a gong or bell 23 disposed adjacent to the flange on which there is a clapper 24 pivoted at 25 and having a wiper end 26 to engage a cam or star wheel 27 which is also secured on the sleeve 13, this latter being rotatable about its hub or bearing portion 14 of the plate 15. The bell is normally constrained to rotate in one direction by the tension of a spiral spring 28 one end of which is secured to the sleeve 13 while its opposite end is secured as at 29 to the casing 3. A simple and suitable locking or latching device may be utilized to hold the rotative parts against the action of the spring until a predetermined moment and this is accomplished in the present case by a latch consisting of a pin or bar 30 slidably mounted in the bearing 31 on the top of the gong against one end of which bearing reacts a spring 32 bearing on a shoulder 33 of the pin the outer end of which pin is designed to engage a notch or keeper 34 in or on the casing 3 in the plane of the pin. The inner end of the pin is designed to bear upon the surface of the spindle or indicating pin 11 which is shown as provided with an inclined or cam acting portion 35 inclined so that when the pin 11 rises under pneumatic pressure the latch 30 is shifted outwardly by the cam surface 35 to interlock with the keeper or notch 34 and it is held in this place by riding on the straight and adjacent side of the indicating pin 11. As soon as the pressure falls the latch pin 30 is permitted to move inwardly as the cam surface 35 passes its end and the spring 32 disengages the latch from its keeper 34 whereupon the gong is released and allowed to rotate under the impulse of its spring 28.

In the form of the invention illustrated in Figs. 6 to 9 inclusive the general construction of the casing and the valve is the same as above referred to and there is utilized the disk 10 which rests upon the inflatable bag 8 but the plate 15 is omitted and a movable plate 15$^a$ is utilized this being provided with springs 15$^b$ which react upon the plate 10 to lift the plate 15$^a$ to normally thrust a series of loosely arranged bell engaging devices as balls 35 against the gong or bell 23 which in this case is attached to a stationary guide 13$^a$ in which the pin 11 extending up from the plate 10 is movably inclosed but its upper end is exposed so that the graduations or index figures on opposite faces thereof may be viwed through the window cap 22. The sleeve or guide 13$^a$ is shown as adjustably mounted in a plate 36 threaded in the adjacent portion of the casing 3 so as to adjust the tension of the spring 17 reacting upon the plate 10. The disk 10 thus forms one kind of a piston of which any suitable embodiment may be used.

What I claim is—

1. An audible signal giving device for pneumatic tires, comprising a casing attachable to the usual tire stem and having communication with the chamber thereof, an inlet valve on the casing permitting inflation and compression of air in the tire and device, an inflatable bag in the casing to receive the air, a sounding element in the casing, and means which is controlled by the said bag when it is inflated and which causes the sounding of the device when pressure in the bag falls to a predetermined degree, the sounding means including a rotatable gong with rotating mechanism, and a lock therefor automatically releasing the gong for rotation when the pressure falls as stated.

2. A tire attachment comprising an audible alarm, a pressure indicator, means for injecting air into said tire, and a common housing for all said means.

3. A tire attachment comprising an audible alarm, a pressure register, means for injecting air into said tire, a common air canal common to all said means, and a common housing for all said means.

4. A tire alarm and pressure register comprising a piston, a stem on said piston, means for yieldingly holding said piston against pressure, graduations on said stem, an index fixed in relation to movement of said stem, and a cam on said stem operative of an audible alarm.

5. A tire alarm and pressure indicator comprising a piston, a stem on said piston, means for yieldingly holding said piston against pressure, graduations on said stem, an index fixed in relation to the movement of said stem, a cam on said stem operative of an audible alarm, and a cup forming a cylinder for said piston and a housing for said indicator and alarm.

6. A tire alarm comprising a piston, a rectangular stem on said piston, a helical spring around said stem for yieldingly holding said piston against pressure, a spiral spring surrounding said stem, a bell, a clapper for said bell, means for operating said clapper by the release of said spiral spring, means on said stem for releasing said spiral spring, and means for moving said piston by variations in pressure in said tire.

7. A tire alarm comprising a piston, a stem on said piston, a helical spring around said stem for yieldingly holding said piston against pressure, a spiral spring surrounding said stem, a bell, a clapper for said bell, means for operating said clapper by the release of said spiral spring, means on said stem for releasing said spiral spring, means for moving said piston by variations in pressure in said tire, and a pressure indicator on said stem.

In testimony whereof I have affixed my signature.

HAROLD BROWN.